(12) United States Patent
Bourvellec et al.

(10) Patent No.: US 12,174,077 B2
(45) Date of Patent: Dec. 24, 2024

(54) METHOD FOR INDIVIDUAL MEASUREMENT OF THE TEMPERATURE OF A PREFORM

(71) Applicant: SIDEL PARTICIPATIONS, Octeville-sur-Mer (FR)

(72) Inventors: Loïc Bourvellec, Octeville-sur-Mer (FR); Yann Girard, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 395 days.

(21) Appl. No.: 17/272,071

(22) PCT Filed: Aug. 5, 2019

(86) PCT No.: PCT/FR2019/051901
§ 371 (c)(1),
(2) Date: Feb. 26, 2021

(87) PCT Pub. No.: WO2020/043974
PCT Pub. Date: Mar. 5, 2020

(65) Prior Publication Data
US 2021/0325263 A1    Oct. 21, 2021

(30) Foreign Application Priority Data
Aug. 28, 2018 (FR) ...................... 1857710

(51) Int. Cl.
*G01K 13/06* (2006.01)
*B29C 49/12* (2006.01)
(Continued)

(52) U.S. Cl.
CPC .............. *G01K 13/06* (2013.01); *B29C 49/12* (2013.01); *B29C 49/6409* (2013.01);
(Continued)

(58) Field of Classification Search
CPC .... G01K 13/06; B29C 49/12; B29C 49/6409; B29C 49/786
(Continued)

(56) References Cited

U.S. PATENT DOCUMENTS 5,773,316 A * 6/1998 Kurosaki .............. B24B 37/013
                                                    374/161
7,980,758 B2 * 7/2011 SempriMoschnig .. G01N 25/72
                                                    374/124
(Continued)

FOREIGN PATENT DOCUMENTS

CN          101906622 A    12/2010
DE       102015101769 A1    8/2016
(Continued)

OTHER PUBLICATIONS

International search report dated Nov. 11, 2019.

*Primary Examiner* — Tarun Sinha

(57) ABSTRACT

The invention concerns a method for measuring the temperature of a preform in a facility comprising: a device for transporting preforms; a device for contact-less measurement of the temperature of a portion of the preform, comprising a sensor which is capable of measuring the temperature of the preforms in continuous travelling motion over a measurement section of the production path. The measurement device is equipped with an optical device which can project an image of the sensor in a measurement direction in the zone for measuring the temperature of the preforms, the measurement zone having a cross-section of dimensions less than the outer diameter of the portion of the preform to be measured. The invention also concerns a facility for implementing the method.

20 Claims, 3 Drawing Sheets

(51) Int. Cl.
 *B29C 49/64* (2006.01)
 *B29C 49/78* (2006.01)
 *B29K 67/00* (2006.01)
 *B29L 31/00* (2006.01)

(52) U.S. Cl.
 CPC ............ *B29C 49/786* (2013.01); *B29C 49/78* (2013.01); *B29K 2067/003* (2013.01); *B29L 2031/712* (2013.01)

(58) Field of Classification Search
 USPC ......................................................... 374/120
 See application file for complete search history.

(56) References Cited

U.S. PATENT DOCUMENTS

2011/0236518 A1   9/2011   Cetinel et al.
2018/0024013 A1 * 1/2018   Kammerl ............ G01K 15/005
                                              374/1

FOREIGN PATENT DOCUMENTS

FR          2935924 A1 *  3/2010   ........... B29B 13/024
WO       2016012704 A1    1/2016

* cited by examiner and a device for contactlessly measuring the temperature of a part of the preforms comprising a sensor which is capable of measuring the temperature of the preforms running continuously over a measurement section of the production path;

METHOD FOR INDIVIDUAL MEASUREMENT OF THE TEMPERATURE OF A PREFORM

TECHNICAL FIELD OF THE INVENTION

The invention relates to an installation for producing containers by forming preforms, notably by stretch blow-molding, comprising a device for measuring the temperature of the preforms.

TECHNICAL BACKGROUND OF THE INVENTION

It is known practice to manufacture containers by forming, notably by stretch blow-molding, preforms made of thermoplastic material. Prior to the forming operation, the preforms are heated to a glass transition temperature which allows them to be shaped into the final container.

More particularly, the preforms generally have a body that is substantially cylindrical of revolution with thick tubular wall which is closed at one of its axial ends by a thick-walled bottom, and which is extended at its other end by a neck, which is also tubular. The neck is shaped to its final form and dimensions while the body of the preform is intended to undergo a relatively significant deformation to shape it into the container in a forming step.

For this reason, it is preferable for only the body of the preform to be heated beyond the glass transition temperature, the neck remaining at a temperature lower than said glass transition temperature to avoid the deformation thereof.

Mass-produced containers are manufactured in a production installation which comprises a heating station which is used, in a preliminary heating step, to render the body of the preform malleable by heating beyond the glass transition temperature.

The manufacturing installation also comprises a forming station which is arranged downstream of the heating station. During the forming step, the hot preform is placed in a mold of the forming station which has a molding die conforming to the container to be obtained. A pressurized fluid, such as air, is then injected into the malleable body of the preform in order to press the wall thereof against the die of the mold.

The temperature of the preforms along their path in the manufacturing installation is an essential parameter which should preferably be controlled. For example, if the body of a preform is too cold during the forming operation, that can damage a stretch rod of the molding unit.

For this reason, it is known practice to equip the manufacturing installations with contactless temperature sensors which make it possible to measure the temperature of the preforms on the fly as they run through the installation.

The sensors currently used are arranged so as to measure the average temperature of several running preforms. The sensors make it possible, for example, to know the average temperature of eight consecutive preforms. When a fault is detected, it is not possible to know whether several preforms are involved in the fault or indeed which preforms are concerned. Thus, each time a fault is observed by the sensor, the installation ejects all the preforms on which the defective average measurement has been performed.

Some preforms having a temperature that nevertheless conforms to expectations are therefore frequently ejected at the same time as the preforms whose temperature is defective. The result thereof is a significant loss of preforms.

Furthermore, for some applications, notably food or pharmaceutical, the containers must be produced in aseptic conditions. To this end, each preform must have a temperature above a determined threshold, for example 100° C. If that is not the case, it does not comply with the manufacturing standards and it must be ejected.

However, the current measurement method does not make it possible to know the individual temperature of each preform. This therefore does not make it possible to ensure an optimal tracking of the preforms when specifications have to be observed, for example for the production of aseptic containers.

BRIEF SUMMARY OF THE INVENTION

The invention proposes a method for measuring the temperature of a preform in an installation for manufacturing containers by forming preforms made of thermoplastic material, notably PET, the installation comprising:
a device for conveying the preforms that moves the preforms continuously in a line along a production path;
a station for heating the preforms which is passed through by the production path;
a device for contactlessly measuring the temperature of a part of the preforms comprising a sensor which is capable of measuring the temperature of the preforms running continuously over a measurement section of the production path;
wherein the measurement device is equipped with an optical device which allows an image of the sensor to be projected in a measurement direction in a zone for measuring the temperature of the preforms, the measurement zone having a section of dimensions smaller than the outer diameter of the part of the preform to be measured in order to individually measure the temperature of the preform.

According to other features of the method:
the response time needed for the measurement device to supply a temperature measurement is less than the exposure time during which the part to be measured of a running preform cuts the measurement zone;
the parts to be measured of two adjacent preforms are separated in the running direction by an interval of a width greater than the dimensions of the section of the measurement zone;
the measurement direction is oriented toward the measurement section by forming, with the direction of movement of the preforms, an angle such that when a preform leaves the measurement zone and before the next preform enters into the measurement zone, the measurement zone remains within the interval for a time greater than or equal to the response time of the measurement device;
the measurement direction is oriented toward the measurement section orthogonally to the direction of movement of the preforms in order to obtain a maximum exposure time in the measurement zone of the part to be measured of each preform;
the preforms run in a rectilinear direction all along the measurement section.

The invention relates also to an installation for implementing the method performed according to the teachings of the invention, comprising:
a device for conveying preforms in a line along a production path;
a station for heating the preforms which is passed through by the production path;

a device for contactlessly measuring the temperature of a part of the preforms comprising a sensor which is capable of measuring the temperature of the preforms running continuously over a measurement section of the production path;

wherein the measurement device is equipped with an optical device which allows an image of the sensor to be projected in a measurement direction in a measurement zone situated on the measurement section of the production path.

According to other features of the invention:

the measurement device is arranged in proximity to the measurement section, the measurement direction being orthogonal to the direction of movement of the preforms over the measurement section;

the measurement section is arranged in the heating station;

the measurement section is arranged downstream and/or upstream of the heating station.

BRIEF DESCRIPTION OF THE FIGURES

Other features and advantages of the invention will become apparent from reading the following detailed description, for an understanding of which reference will be made to the attached drawings in which.

DETAILED DESCRIPTION OF THE FIGURES

Hereinafter in the description, the elements that have an identical structure or similar functions will be designated by the same reference.

Hereinafter in the description and in a nonlimiting manner, a longitudinal orientation "L", directed from back to front in the direction of movement of the preforms, a vertical orientation "V", directed upward parallel to the main axis of the preforms, and a transverse orientation "T", directed at right angles to the longitudinal and transverse orientations will be adopted. These orientations are indicated by the trihedron "L, V, T" in the figures.

Figure 1:
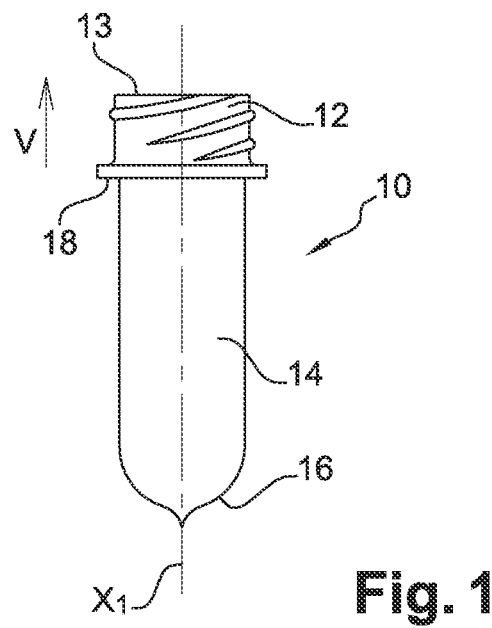
FIG. 1 is a side view which represents a preform which can be subjected to the method performed according to the teachings of the invention.

FIG. 1 represents a preform 10 made of a thermoplastic material such as polyethylene terephthalate, better known by its acronym "PET". The preform 10 is, for example, obtained by injection molding. The preform 10 is intended to be transformed into a final container (not represented) during a forming method.

The preform 10 has a generally axisymmetrical form of vertical axis "X1". The preform 10 comprises a top neck 12 which has a tubular cylindrical form of axis "X1". The neck 12 is intended to retain its form during the forming method. The neck 12 is delimited axially upward by an annular free edge called widemouth 13.

The neck 12 emerges axially downward into a body 14 which has a tubular cylindrical wall whose axis is coaxial to the vertical main axis "X1". The body 14 is closed axially downward by a bottom 16 of generally hemispherical form.

The neck 12 is already molded to its final form. It is provided, on its outer face, with means for fixing a stopper, such as a threading or a groove. A radially protruding collar 18 marks the separation between the body 14 and the neck 12. Hereinbelow, the collar 18 will be considered to form part of the neck 12.

At the end of their injection molding, the preforms 10 are abruptly cooled, for example by quenching, to give the thermoplastic material an amorphous state. It is thus possible to render the thermoplastic material once again malleable by heating beyond a glass transition temperature. The term "malleable" means that the yield strength of the duly heated material is very substantially lower than the yield strength of said material having a temperature lower than the glass transition temperature.

Figure 2:
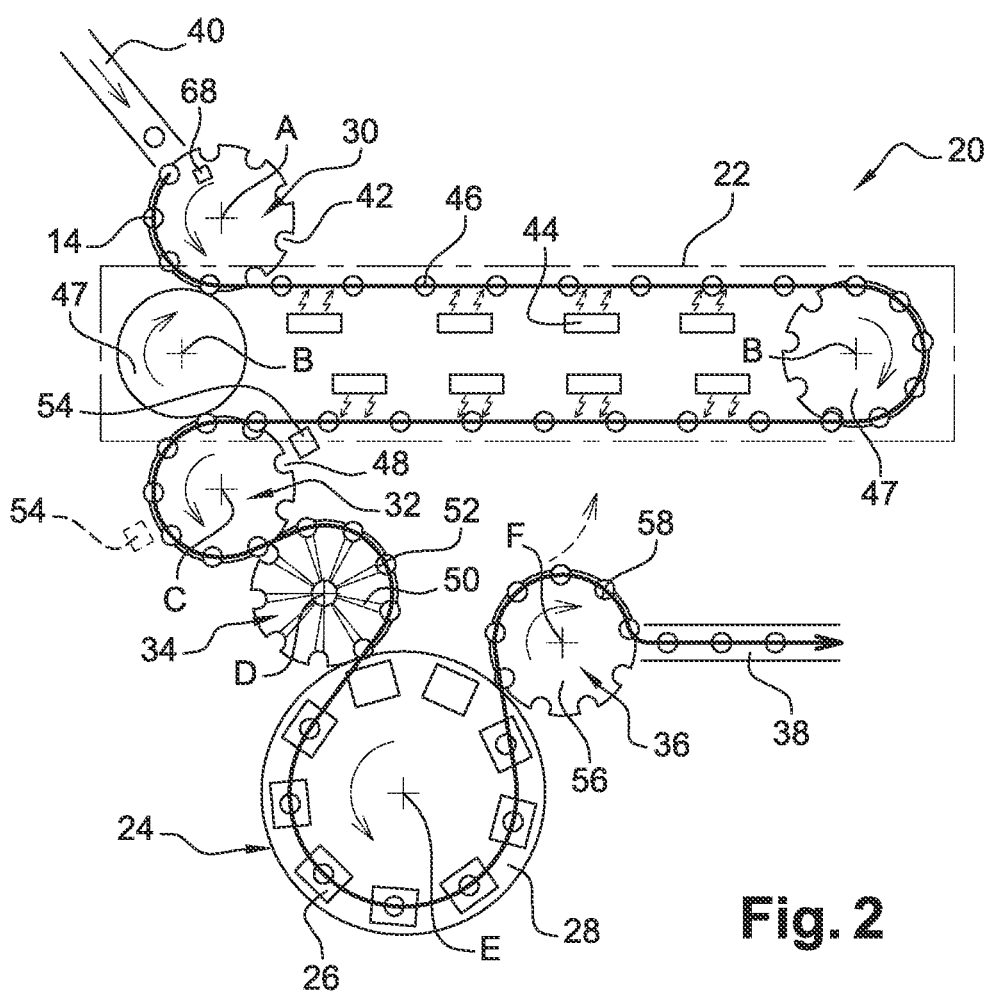
FIG. 2 is a plan view which schematically represents an installation for manufacturing containers from the preform of FIG. 1, the installation comprising a temperature measurement device for implementing the method performed according to the teachings of the invention.
Figure 3:
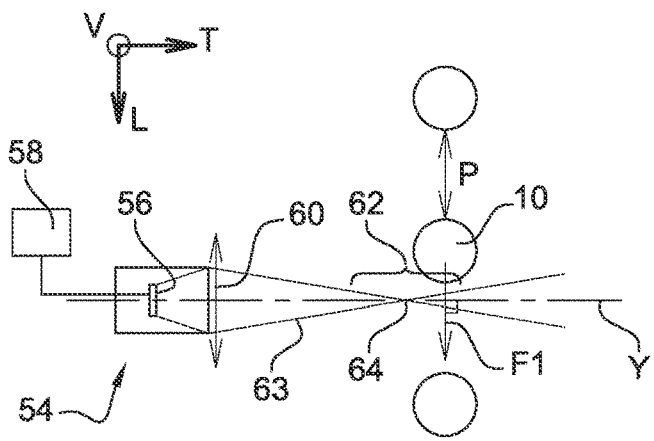
FIG. 3 is a plan view on a larger scale which represents the measurement device arranged in proximity to a measurement section of the preform running path.

FIG. 2 schematically represents an installation 20 for manufacturing final containers from such a preform 10.

The installation 20 comprises several processing stations. Of the processing stations with which such installations 20 are routinely equipped, a heating station 22 and a forming station 24 provided with several molding units 26 mounted on the periphery of a carousel 28 have been represented here.

It will be understood that the installation 20 can comprise other processing stations which are not represented here.

This is an installation 20 for forming containers continuously. The hollow bodies are thus constant in motion between their entry into the installation 20 in the form of a preform 10 and their exit in the form of final containers. This makes it possible to obtain a greater container production throughput. To this end, the installation 20 comprises several devices for conveying the hollow bodies.

As a variant, the invention is applicable to an installation operating sequentially.

The installation 20 comprises a first transfer wheel 30 at the entry to the heating station 22, a second transfer wheel 32 at the exit from the heating station 22, and a third transfer wheel 34 interposed between the second transfer wheel 32 and the forming station 24. Finally, a fourth transfer wheel 36 is arranged at the exit from the forming station 24 for transferring the hollow bodies, here the final containers, to a conveyor 38 such as a belt or an air conveyor.

The hollow bodies run in the installation 20 along a determined production path which is indicated by a bold line in FIG. 2.

The hollow bodies arrive, in the form of preforms 10, in succession one after the other by a ramp 40 which feeds the first transfer wheel 30, forming a first device for conveying the hollow bodies. The first transfer wheel 30 has, at its periphery, several support notches each forming a member 42 for holding a hollow body. The holding members 42 are thus embedded on the disk.

The first transfer wheel 30 is mounted to rotate about a vertical central axis "A" in a counterclockwise direction referring to FIG. 1. The holding members 42 thus move along a closed circuit of circular form about the axis "A".

The hollow bodies, here the preforms 10, are conveyed from the ramp 40 to an input of the heating station 22 along the production path. When a hollow body has been transmitted to the heating station 22, the holding member 42 continues its movement empty along the closed circuit to return to its starting point and load a next hollow body. A useful section, represented by a bold line in FIG. 2, of said circuit forms an open section of the production path.

In a variant of the invention that is not represented, the holding members 42 of the first transfer wheel 30 are formed by clamps for gripping a hollow body.

Then, the hollow bodies, still in the form of preforms 10, are conveyed through the heating station 22 to be heated therein prior to the stretching or stretch blow-molding operations. To this end, the heating station 22 is equipped with heating means 44, such as halogen lamps or laser diodes, emitting an electromagnetic radiation to heat the body 14 of the preforms 10, for example an infrared radiation at a power and over a predetermined spectrum which interacts with the material of the preform 10 in order to heat it.

The heating station 22 is also equipped with ventilation means (not represented), such as fans or pulsed air devices known as "air blades". The ventilation means help to regulate the temperature of the hollow body. The ventilation means comprise air flow rate control means.

The parameterizing of each heating means can be controlled to heat certain portions of the hollow body more or less. The parameterizing, notably the position of each heating means, is, for example, controlled automatically by an electronic control unit (not represented).

Each hollow body is borne by a rotary mandrel, also called spinner, which forms a holding member 46 associated with the heating station 22. Such a holding member 46 conventionally comprises a mandrel (not represented) which is fitted into the neck 12 of a preform 10, and a pinion meshing with a fixed rack running along the production path so as to ensure a substantially uniform rotation of the hollow body while it is being heated.

In a variant, each hollow body is driven in rotation by an individual electric motor. The rotation is then controlled by the electronic control unit.

The holding members 46 are borne by a closed chain which is driven in a clockwise direction by drive wheels 47 which are mounted to rotate about vertical axes "B". This chain of holding members 46 set in motion thus forms a second device for conveying the hollow bodies. Each holding member 46 is, here, moved continuously, that is to say without interruption, along a closed circuit. A useful section, represented in a bold line in FIG. 1, of said circuit forms an open section of the production path.

At the exit from the heating station 22, the hollow bodies, here the hot preforms 10, are then transmitted to the second transfer wheel 32 which has a structure similar to that of the first transfer wheel 30. This second transfer wheel 32 forms a third device for conveying the hollow bodies.

After the transmission of the hollow body to the second transfer wheel 32, each holding member 46 of the heating station 22 continues its path empty along the closed circuit to return to its starting point and load a new hollow body.

The second transfer wheel 32 comprises, at its periphery, several support notches each forming a member 48 for holding a hollow body.

The second transfer wheel 32 is mounted to rotate about a vertical central axis "C" in a counterclockwise direction referring to FIG. 1. The holding members 48 are thus moved in a closed circuit of circular form about the axis "C".

At the exit from the second transfer wheel 32, the hollow bodies, here the hot preforms 10, are transmitted to the third transfer wheel 34. This third transfer wheel 34 forms a fourth device for conveying the hollow bodies.

Thus, the third transfer wheel 34 comprises, at its periphery, several arms 50. The free end of each arm 50 is equipped with a clamp forming a member 52 for holding a hollow body. The third transfer wheel 34 is mounted to rotate about a vertical central axis "D" in a clockwise direction referring to FIG. 2. The holding members 52 are thus moved along a closed circuit about the axis "D".

The arms 50 can pivot about a vertical axis with respect to the hub or even be extended telescopically to allow the separation between two hollow bodies to be varied.

The hollow bodies are thus conveyed from the second transfer wheel 32 to the forming station 24 by following the production path. When a hollow body has been transmitted to the forming station 24, the associated holding member 52 continues its movement empty along the closed circuit to return to its starting point and load a new hollow body. A useful section, represented by a bold line in FIG. 2, of said circuit forms an open section of the production path.

Upon their transfer to the forming station 24, each hollow body, here in the form of hot preform 10, is inserted into one of the molding units 26 of the forming station 24. The molding units 26 are driven by continuous and regular movement about the vertical axis "E" of the carousel 28 in a counterclockwise direction referring to FIG. 1. The molding units 26 thus move along a closed circuit of circular form about the axis "E".

During their forming, the hollow bodies are thus conveyed from the third transfer wheel 34 to the fourth transfer wheel 36. During their conveying, the hollow bodies are transformed into final containers by stretch blow-molding forming means which are well known and which will not be described in more detail hereinbelow.

Generally, such a forming installation 20 can produce final containers of different formats. To this end, the molding units 26 with which the forming station 24 is equipped are provided with interchangeable molds. Thus, it is possible to modify the form of the final container produced. Furthermore, the preforms 10 can have bodies 14 and/or necks 12 of different outer diameters depending on the final container format to be obtained.

It is very important to be able to control the temperature of preforms 10 along their path in order to guarantee a good-quality final container.

To this end, the installation 20 comprises at least one device 54 for contactlessly measuring the temperature of a part of the preforms 10. Said part of the preforms 10 is, for example, formed by the body 14 or by the neck 12.

The measurement device 54 comprises a sensor 56 which can measure the temperature of the preforms 10 running continuously over a measurement section of the production path. The measurement section is, here, arranged in the heating station 22, in immediate proximity to the exit from the heating station 22, along the path of the movement of the holding members 46, as is illustrated in FIG. 2. The preforms 10 thus run in a rectilinear longitudinal direction all along the measurement section.

In a variant of the invention represented by dotted lines in FIG. 2, the measurement section is arranged downstream of the heating station 22, for example to measure the temperature of the preforms 10 borne by the second transfer wheel 32. In this case, the preforms 10 run along a measurement section in the form of a circular arc.

In a variant of the invention that is not represented, a measurement device produced according to the teachings of the invention can also be arranged upstream of the heating station 22, for example to make it possible to know the temperature of the preforms before their entry into the heating station in order to adjust the heating power, notably when the preforms are particularly cold.

The sensor 56 communicates the temperature information to an electronic control unit 58 which makes it possible to determine the temperature of the preform 10. The electronic control unit 58 can then, if necessary, command the automatic ejection of a preform 10 whose temperature does not conform, or even modify the heating setpoint of the heating station 22 if several preforms 10 have a non-conforming temperature within a determined time interval.

The measurement device 54 is equipped with an optical device 60 which allows an image of the sensor 56 to be projected in a main measurement direction "Y" on a measurement zone 62. The measurement zone 62 has a section of dimension very much smaller than the outer diameter of the part of the preform 10 to be measured in order to individually measure the temperature of the preform 10. Thus, the temperature of each preform 10 is measured individually and successively.

The optical device 60 is, here, a convergent optical device, such as a convergent lens or an optical instrument, which creates a measurement beam 63 globally forming a cone which converges toward a focusing point 64. The measurement zone 62 is formed by a section of the measurement beam 63 situated in immediate proximity to and/or comprising the focusing point 64 so as to have a very small section.

As represented in FIGS. 3 to 6, the preforms 10 move in a line in a longitudinal direction indicated by the arrow "F1".

The measurement direction "Y" is, here, oriented toward the measurement section orthogonally to the direction of movement of the preforms 10, that is to say transversely.

Figure 4:
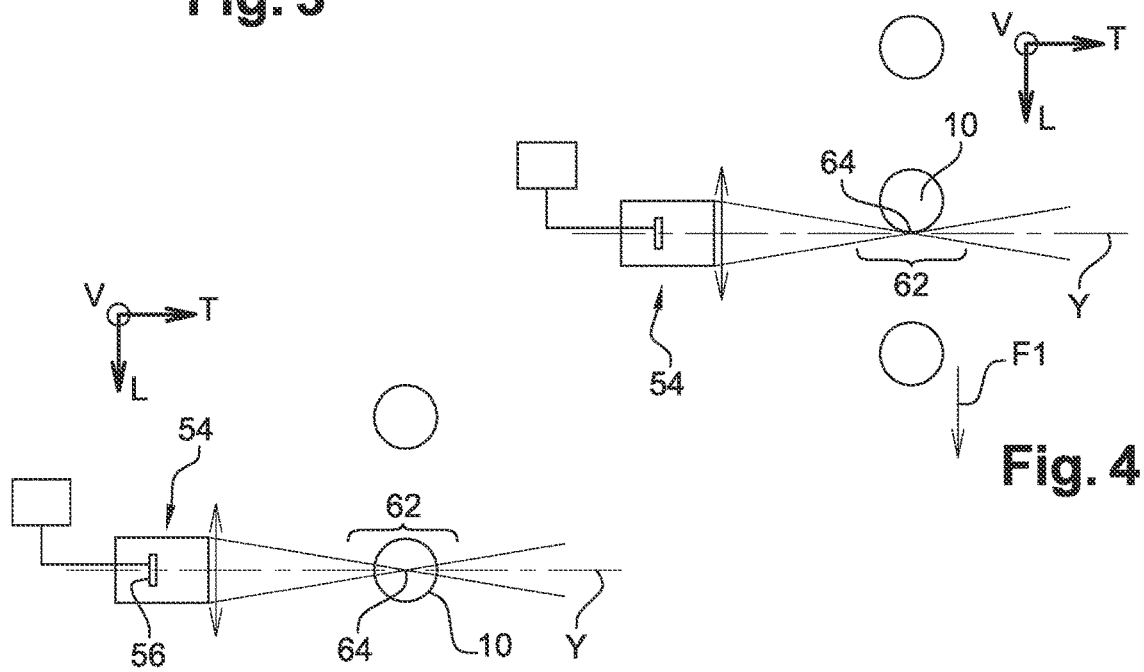
FIGS. 4 to 6 represent a preform entering, passing through then leaving a temperature measurement zone of the measurement device.
Figure 5:
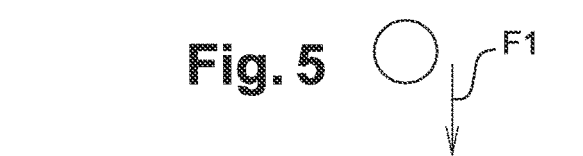
Figure 6:
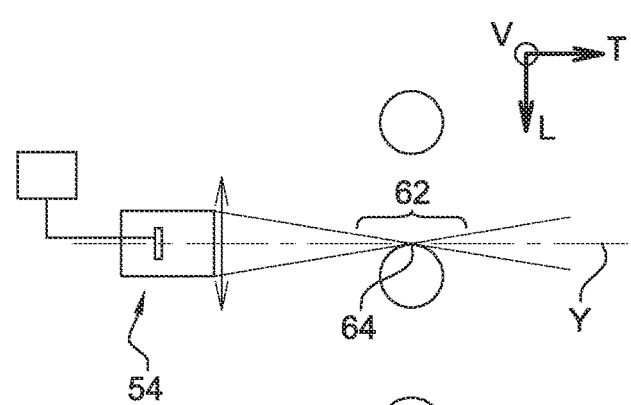

When a preform 10 cuts the measurement beam 63 in the measurement zone 62, as represented in FIG. 4, the sensor 56 begins to measure the temperature of the preform 10. The preform 10 continues its path by continuing to cut the measurement beam 63 in the measurement zone 62 as indicated in FIG. 5, until it exits from the measurement beam 63.

As can be seen, because of the circular form of the outline of the section of the preform 10, the measurement cannot be performed at the same point of the measurement beam 63 permanently. In fact, the temperature sensor 56 is fixed with respect to the chassis of the installation 20. However, the part of preform to be measured remains within a measurement zone 62 of which any section has dimensions smaller than the outer diameter of the part of preform 10 to be measured.

Moreover, the dimension of the section of the measurement zone 62 is sufficiently small for the measurement device 54 to be able to perform measurements on a single preform 10 at a time while it circulates along the production path.

For the rest of the description and for the claims, the time of exposure of a preform 10 to the sensor 56 is defined as being the period during which the preform 10 cuts the measurement beam 63. Obviously, by maximizing the exposure time of the preform 10, it is possible to obtain the best possible temperature measurement. To this end, the maximum exposure time is obtained for a measurement direction "Y" orthogonally arranged in the preform 10 running direction, as represented in FIGS. 3 to 6.

Obviously, the response time needed for the measurement device 54 to provide a temperature measurement is less than the exposure time for which the body of a running preform passes in front of the measurement zone. By maximizing the preform 10 exposure time, it is possible to perform a measurement even for high running speeds.

Figure 7:
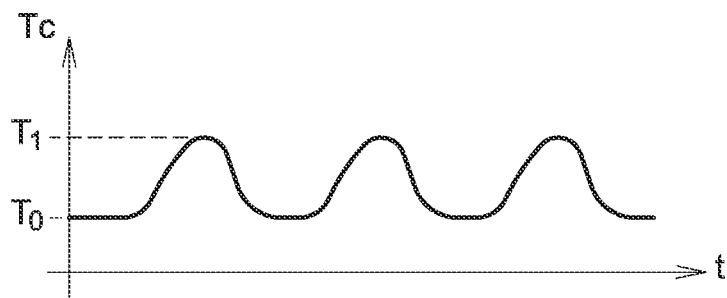
FIG. 7 is a diagram representing a signal emitted by the measurement device which is representative of the measured temperature as a function of time.

The parts to be measured of two adjacent preforms 10 are separated in the running direction, that is to say longitudinally, by an interval "P" of width greater than the dimensions of the measurement zone 62. Thus, between two preforms 10, the temperature sensor 56, which operates continuously, measures the temperature of the ambient air. This ambient temperature forms a reference temperature. This makes it possible to simplify the analysis of the measurement results. Indeed, referring to FIG. 7, the temperature sensor 56 emits a signal representative of the measured temperature as a function of time. The signal has peaks, which correspond to the measurement of the temperature "T1" of the preform 10, and dips which correspond to the reference temperature "T0". It is therefore easy to identify the temperature of two successive preforms 10 on this signal.

Figure 8:
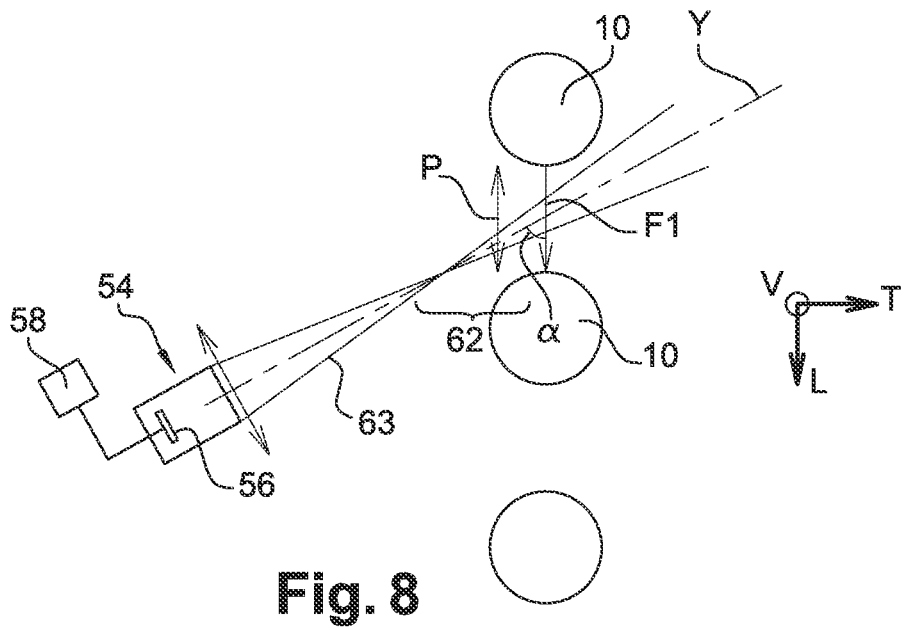
FIG. 8 is a view similar to that of FIG. 3 which represents a variant embodiment in which the measurement direction is inclined with respect to the preform running direction.

In a variant represented in FIG. 8, the measurement direction "Y" can be oriented toward the preforms 10 by forming, with the direction of movement of the preforms, an angle "α" other than 90°. This angle "α" is selected so as to obtain an exposure time of each preform 10 that is sufficient for the sensor 56 to be able to perform a measurement of the temperature of each preform 10.

Furthermore, this angle "α" is chosen such that, when a preform 10 exits from the measurement zone 62 and before the next preform 10 enters into the measurement zone 62, the measurement zone 62 remains within the interval "P", as indicated in FIG. 8, for a time greater than or equal to the response time of the measurement device 54.

Figure 9:
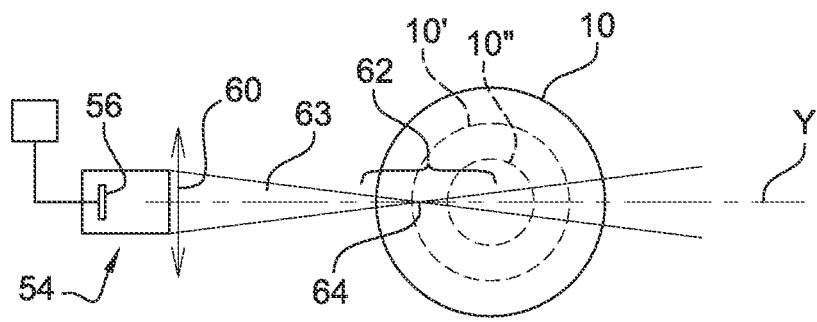
FIG. 9 is a plan view which simultaneously represents preforms of several diameters passing into the measurement zone of the measurement device.

As represented in FIG. 9, the focusing point 64 is arranged so that the measurement zone 62 can be adapted to different diameters of preforms 10, 10', 10" without it being necessary to move the measurement device 54.

The invention thus makes it possible to obtain the temperature of each preform 10 individually. This also makes it possible to guarantee that a preform 10 can be detected individually.

The invention claimed is:

1. A method for measuring the temperature of a preform in an installation for manufacturing containers by forming preforms made of a thermoplastic material comprising:
   moving the preforms continuously in a line along a production path using a device;
   heating the preforms in a station which is passed through by the production path;
   contactlessly measuring the temperature of a part of the preforms using a device comprising a sensor which sensor measures the temperature of the preforms running continuously over a measurement section of the production path, the device and sensor thereof remaining spaced a distance from the preforms without making contact therewith as they move along the production path;
   wherein the measurement device is equipped with a convergent optical device which allows an image of the sensor to be projected in a measurement direction Y in a zone for measuring the temperature of each of the preforms, the measurement zone having a section of dimensions smaller than the outer diameter of the part of the preform to be measured in order to individually and successively measure the temperature of each preform.

2. The method as claimed in claim 1, wherein the response time needed for the measurement device to supply a temperature measurement is less than the exposure time during which the part to be measured of a running preform cuts the measurement zone.

3. The method as claimed in claim 1, wherein the parts to be measured of two adjacent preforms are separated in the running direction by an interval P of a width greater than the dimensions of the section of the measurement zone.

4. The method as claimed in claim 1, wherein the measurement direction Y is oriented toward the measurement section by forming, with the direction of movement of the preforms, an angle such that when a preform leaves the measurement zone and before the next preform enters into the measurement zone, the measurement zone remains within the interval P for a time greater than or equal to the response time of the measurement device.

5. The method as claimed in claim 1, wherein the measurement direction Y is oriented toward the measurement section orthogonally to the direction of movement of the preforms in order to obtain a maximum exposure time in the measurement zone of the part to be measured of each preform.

6. The method as claimed in any one of the preceding claims claim 1, wherein the preforms run in a rectilinear direction all along the measurement section.

7. An installation for implementing the method as claimed in claim 1, comprising:
   the device for conveying the preforms in a line along a production path;
   the station for heating the preforms which is passed through by the production path;
   the device for contactlessly measuring the temperature of a part of the preforms comprising a sensor which is capable of measuring the temperature of the preforms running continuously over a measurement section of the production path;
wherein the measurement device is equipped with a convergent optical device which allows an image of the sensor to be projected in a measurement direction Y in a measurement zone situated on the measurement section of the production path.

8. The installation as claimed in claim 1, wherein the measurement device is arranged in proximity to the measurement section, the measurement direction being orthogonal to the direction of movement of the preforms over the measurement section.

9. The installation as claimed in claim 7, wherein the measurement section is arranged in the heating station.

10. The installation as claimed in claim 7, wherein the measurement section is arranged downstream and/or upstream of the heating station.

11. The method as claimed in claim 2, wherein the parts to be measured of two adjacent preforms are separated in the running direction by an interval P of a width greater than the dimensions of the section of the measurement zone.

12. The method as claimed in claim 2, wherein the preforms run in a rectilinear direction all along the measurement section.

13. The method as claimed in claim 3, wherein the preforms run in a rectilinear direction all along the measurement section.

14. The method as claimed in claim 4, wherein the preforms run in a rectilinear direction all along the measurement section.

15. An installation for implementing the method as claimed in claim 2, comprising:
    the device for conveying the preforms in a line along a production path;
    the station for heating the preforms which is passed through by the production path;
    the device for contactlessly measuring the temperature of a part of the preforms comprising a sensor which is capable of measuring the temperature of the preforms running continuously over a measurement section of the production path;
wherein the measurement device is equipped with a convergent optical device which allows an image of the sensor to be projected in a measurement direction Y in a measurement zone situated on the measurement section of the production path.

16. An installation for implementing the method as claimed in claim 3, comprising:
    the device for conveying the preforms in a line along a production path;
    the station for heating the preforms which is passed through by the production path;
    the device for contactlessly measuring the temperature of a part of the preforms comprising a sensor which is capable of measuring the temperature of the preforms running continuously over a measurement section of the production path;
wherein the measurement device is equipped with a convergent optical device which allows an image of the sensor to be projected in a measurement direction Y in a measurement zone situated on the measurement section of the production path.

17. An installation for implementing the method as claimed in claim 4, comprising:
    the device for conveying the preforms in a line along a production path;
    the station for heating the preforms which is passed through by the production path;
    the device for contactlessly measuring the temperature of a part of the preforms comprising a sensor which is capable of measuring the temperature of the preforms running continuously over a measurement section of the production path;
wherein the measurement device is equipped with a convergent optical device which allows an image of the sensor to be projected in a measurement direction Y in a measurement zone situated on the measurement section of the production path.

18. An installation for implementing the method as claimed in claim 5, comprising:
    the device for conveying the preforms in a line along a production path;
    the station for heating the preforms which is passed through by the production path;
    the device for contactlessly measuring the temperature of a part of the preforms comprising a sensor which is capable of measuring the temperature of the preforms running continuously over a measurement section of the production path;
wherein the measurement device is equipped with a convergent optical device which allows an image of the sensor to be projected in a measurement direction Y in a measurement zone situated on the measurement section of the production path.

19. The installation as claimed in claim 8, wherein the measurement section is arranged in the heating station.

20. The installation as claimed in claim 8, wherein the measurement section is arranged downstream and/or upstream of the heating station.

* * * * *